J. R. Robinson,
Steam-Boiler Furnace.
No. 79.
" 1,184.
Reissued May 14, 1861.
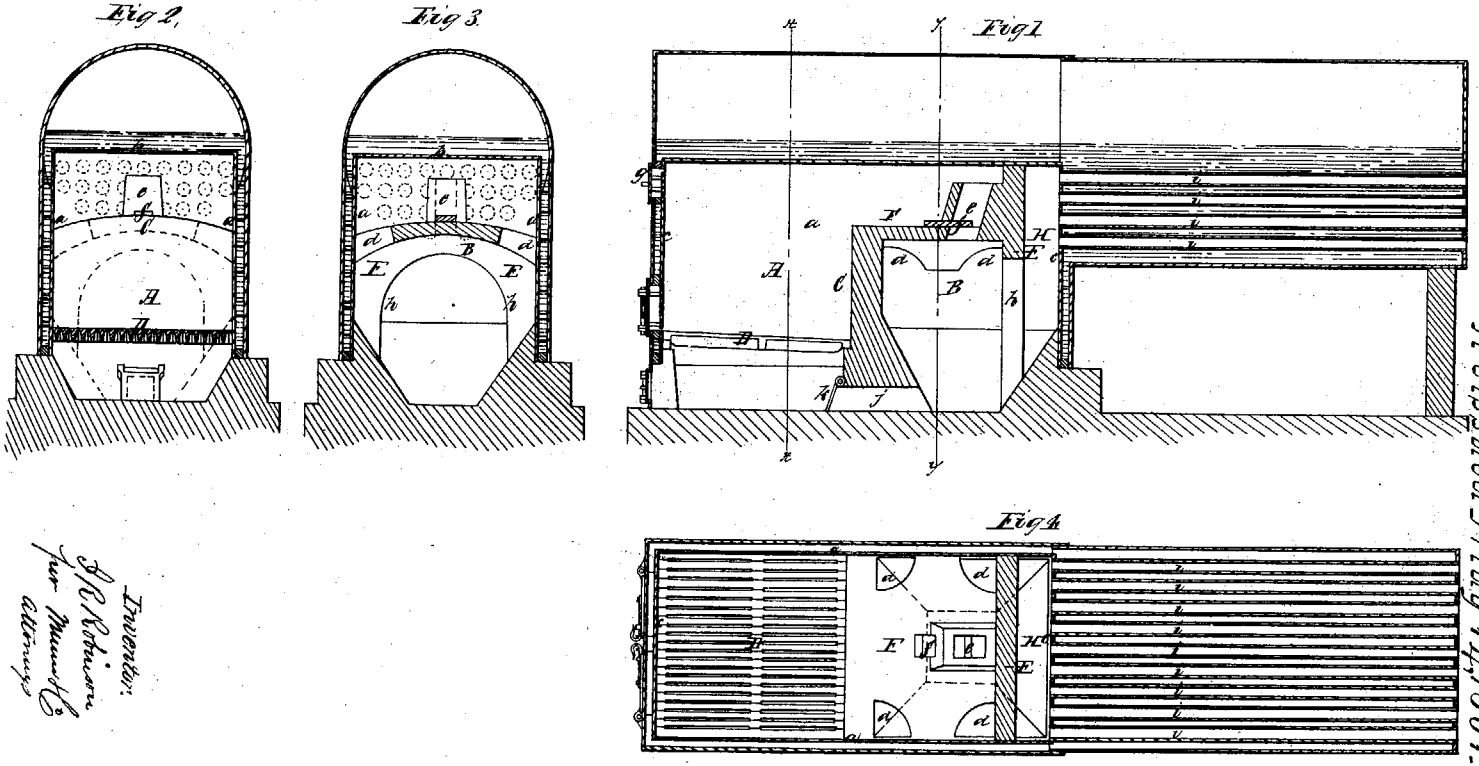
Witnesses
J. W. Coombs,
R. S. Spencer
Inventor:
J. R. Robinson
per Munn & Co
attorneys
N. PETERS, PHOTO-LITHOGRAPHER, WASHINGTON, D. C.

UNITED STATES PATENT OFFICE.

J. R. ROBINSON, OF BOSTON, MASSACHUSETTS.

IMPROVEMENT IN STEAM-BOILER FURNACES.

Specification forming part of Letters Patent No. 623, dated March 5, 1861; Reissue No. 1,134, dated May 14, 1861.

DIVISION NO. 2.

*To all whom it may concern:*

Be it known that I, J. R. ROBINSON, of Boston, in the county of Suffolk and State of Massachusetts, have invented a new and useful Improvement in Steam-Boiler Furnaces, (No. 2;) and I do hereby declare that the following is a full, clear, and exact description of the same, reference being had to the accompanying drawings, forming part of this specification, in which—

Figure 1 is a central longitudinal vertical section of a boiler and furnace with my improvement. Fig. 2 is a transverse vertical section of the same in the line $x^*$ $x^*$ of Fig. 1. Fig. 3 is a transverse vertical section of the same in the line $y^*$ $y^*$ of Fig. 1. Fig. 4 is a horizontal section of the same.

Similar letters of reference indicate corresponding parts in the several figures.

This invention consists in a certain novel construction of a gas-mixing chamber arranged in rear of the fire chamber between the latter and the flue or flues or tubes of the boiler, and a certain novel system of openings of communication between the fire-chamber and the said mixing-chamber, whereby the mixing of the gases in the latter chamber is effected in a very perfect manner, and perfect combustion is obtained with but little excess of air.

It also consists in providing for the drawing of the lighter gases from the fire-chamber or from a chamber or space in communication therewith by means of one or more independent outlets in the upper part of said chamber or space, while the heavier gases and uncombined air are drawn off by a lower outlet or outlets, all of such outlets being in communication with the same chamber or space in which the lighter and heavier gases and air, still in the heated state in which they left the fire-chamber, meet again in such manner as to be mixed and ignited before continuing or completing their passage in contact with the heating-surfaces of the boiler.

To enable others skilled in the art to apply my invention to use, I will proceed to describe its construction and operation.

The boiler represented in the drawings is of the horizontal multitubular kind, with a fire-box. The inner portion, *a b c*, which corresponds in its construction with the fire-box of a locomotive-boiler, is made of greater length, in order that the fire-chamber A and the gas-mixing chamber B may be included within it.

C is the bridge wall erected across the rear of the fire-chamber A, and extending upward above the grate D to a height somewhat greater than the greatest depth of fire likely to be used.

E is a wall erected across the box *a b c* at a short distance from the front tube-sheet, *c*, and extending upward to the crown-sheet *b*, all across the same.

F is an arch thrown across the box *a b c* even with the top of the bridge-wall, and extending from that wall back to the wall E. The space B embraced between the bridge C and wall E under the arch F constitutes the gas-mixing chamber.

*d d* are openings in the arch F for the admission of the heavier gases of combustion and uncombined air from the fire-chamber to the mixing-chamber B, said openings being constructed and arranged close to the sides of the box *a b c*.

*e* is a trunk, which illustrates the second part of my invention, constituting an independent outlet from the space above the arch F into the gas-mixing chamber B, and communicating with the said chamber near the rear thereof and at the middle of its width—that is to say, at the crown of the arch. The said trunk extends upward to near the top of the box *a b c*, that it may receive and constitute an outlet from the fire chamber for the lighter gases only. It is fitted with a sliding damper or valve, *f*, which can be opened and closed wholly or partially by a hook inserted through a door, *g*, in front of the boiler.

*h* is an arched opening in the middle of the wall E, for the passage of the gases from the gas-mixing chamber B to the space H in front of the tube-sheet, from whence they pass into the tubes *i i*.

*j* is a hole through which ashes and dirt may be raked from the chamber B into the ash-pit, and *k* is a door for closing the said hole at all times but when the ashes and dirt are being raked through it.

The operation of my invention may be described as follows: As the combustion of the fuel proceeds in the fire-chamber, the different kinds of gases evolved or produced seek a higher or lower level, according as their specific gravity is less or greater, the lightest gases rising to the top of the fire-chamber and filling the upper part of the space between the arch F and crown-sheet *b*, and escaping to the mixing-chamber B by the trunk or independent outlet *e*, and the heavier gases and uncombined air filling the lower part of the said space and escaping by the openings *d d* to the said chamber. The gases entering the mixing-chamber B by the openings *d d* have imparted to them, by passing over the edges of the said openings, a rolling or eddy-like motion, and meet in the middle of the chamber, and the gases entering the said chamber by the trunk *e* being also delivered to the middle of the said chamber, the whole are mixed very thoroughly and perfect combustion is effected before the advent of the gases to the flues or tubes. The area of the opening of trunk *e* is intended to be so proportioned to that of the openings *d d*, either by constructing it of proper size or by the adjustment of its slide *f*, as to provide for a sufficiently free exit for the light gases which accumulate in the upper part of the fire-chamber, and yet to prevent the said gases escaping so rapidly as not to be well mixed with the heavier gases and consumed, as is so often the case in furnaces from which the heavier and lighter gases are allowed to escape together indiscriminately without any such means of regulation.

The openings *d d* may be provided with slides like the slide *f* applied to the trunk *e*, as it is obvious that by controlling the escape through *d d* the escape through the trunk *e* must at the same time be controlled.

The same construction of the gas-mixing chamber and arrangement of openings *d d* from the fire-chamber may be adapted to the setting of cylinder or other boilers having no fire-boxes within them, the side walls of the setting in such case supplying the place of the sides *a a*. In such adaptation of my invention two trunks, *e e*, will be required—viz., one near each side wall—for the reason that the highest portions of the fire chamber will be at the sides.

What I claim as my invention, and desire to secure by Letters Patent, is—

1. The gas-mixing chamber B, constructed in rear of the bridge-wall C, with a covering-arch, F, and openings *d d* in the said arch, substantially as herein described.

2. Providing a boiler-furnace with one or more trunks, *e*, or equivalent independent outlets from the fire chamber for the exit of the lighter gases of combustion, substantially as herein specified.

3. The combination of one or more trunks, *e*, with a gas-mixing chamber, B, substantially as herein specified.

J. R. ROBINSON.

Witnesses:
J. F. MANNING,
GEO. S. BOUTWELL.